(12) United States Patent \
Piccin et al.

(10) Patent No.: US 12,662,059 B2 \
(45) Date of Patent: Jun. 23, 2026

(54) VEHICLE INTERIOR ASSEMBLY WITH TAMBOUR DOOR

(71) Applicant: Faurecia Interior Systems, Inc., Auburn Hills, MI (US)

(72) Inventors: Hugo Piccin, Cupertino, CA (US); Julien Rea, Sunnyvale, CA (US); Adrián Balbuena Méndez, Puebla (MX); Maxime Leclercq, Fremont, CA (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 1241 days.

(21) Appl. No.: 17/538,112

(22) Filed: Nov. 30, 2021

(65) Prior Publication Data

US 2023/0167676 A1     Jun. 1, 2023

(51) Int. Cl.

| | |
|---|---|
| *B60R 7/04* | (2006.01) |
| *E06B 9/13* | (2006.01) |
| *E06B 9/17* | (2006.01) |
| *B60R 11/00* | (2006.01) |

(52) U.S. Cl.
CPC ......... *B60R 7/04* (2013.01); *B60R 2011/0007* (2013.01); *B60R 2011/0094* (2013.01); *E06B 2009/135* (2013.01); *E06B 2009/17092* (2013.01)

(58) Field of Classification Search
CPC ..... B60R 7/04; B60R 2011/0007; B60Q 3/64; E06B 2009/135; E06B 2009/17092; E06B 2009/1561; B29C 45/0017; B29C 45/14336; B65G 17/066

USPC ........................................................ 296/37.8 \
See application file for complete search history.

(56) References Cited

U.S. PATENT DOCUMENTS

| | | | | |
|---|---|---|---|---|
| 3,767,155 | A | * | 10/1973 | Hovorka ........... B29C 45/14565 |
| | | | | 249/96 |
| 5,018,722 | A | * | 5/1991 | Whitmore .............. B65G 15/32 |
| | | | | 482/54 |
| 5,123,473 | A | | 6/1992 | Henkenjohann |
| 6,883,852 | B2 | | 4/2005 | Laskey |
| 7,125,067 | B2 | * | 10/2006 | Bonnett ................. B60J 5/0416 |
| | | | | 49/502 |
| 7,721,926 | B2 | | 5/2010 | Thomas |

(Continued)

FOREIGN PATENT DOCUMENTS

| | | | | | |
|---|---|---|---|---|---|
| CN | 107891655 | A | * | 4/2018 | ............. B32B 33/00 |
| CN | 211950266 | U | * | 11/2020 | |

(Continued)

OTHER PUBLICATIONS

Extended European Search Report corresponding to application 22210073.7, dated May 10, 2023, 7 pages.

(Continued)

*Primary Examiner* — Daniel J Colilla \
(74) *Attorney, Agent, or Firm* — Reising Ethington P.C.

(57) ABSTRACT

A vehicle interior assembly includes a tambour door that is moveable along end guides between an open position and a closed position. The tambour door includes a plurality of slats interconnected by a unidirectional cord embedded in a plastic material of each one of the slats. The cord, such as yarn of aramid fibers can be molded-in to each one of the slats to simplified formation of the articulated joints between slats.

20 Claims, 3 Drawing Sheets

(56)                References Cited

U.S. PATENT DOCUMENTS

|  |  |  |  |  |
|---|---|---|---|---|
| 9,925,926 | B2 | 3/2018 | Flothmann et al. | |
| 2011/0241371 | A1 * | 10/2011 | Hipshier | B60Q 3/225 |
| | | | | 296/24.3 |
| 2015/0075733 | A1 * | 3/2015 | Piccin | B60R 13/0262 |
| | | | | 160/323.1 |
| 2016/0257256 | A1 * | 9/2016 | Flothmann | B60R 7/04 |
| 2018/0002977 | A1 | 1/2018 | Luber et al. | |
| 2022/0371521 | A1 * | 11/2022 | Taniguchi | B60R 7/04 |

FOREIGN PATENT DOCUMENTS

|  |  |  |  |  |  |
|---|---|---|---|---|---|
| DE | 8909038 | U1 | 11/1989 | | |
| DE | 102013100401 | A1 | 7/2014 | | |
| DE | 102013106903 | A1 | 7/2014 | | |
| DE | 202015100747 | U1 | 5/2016 | | |
| EP | 1048817 | A1 | 11/2000 | | |
| FR | 3052411 | A1 | 12/2017 | | |
| FR | 3053996 | A1 * | 1/2018 | | E06B 9/171 |
| GB | 435556 | A | 9/1935 | | |

OTHER PUBLICATIONS

European Office Action corresponding to application 22210073.7, dated May 3, 2024, 5 pages.

* cited by examiner

VEHICLE INTERIOR ASSEMBLY WITH TAMBOUR DOOR

TECHNICAL FIELD

The present disclosure is related generally to vehicle interior components and, more particularly, to vehicle interior assemblies with tambour doors.

BACKGROUND

One type of closure used in vehicle interiors is a tambour door. Tambour doors may be used to selectively cover and uncover some other part of the vehicle interior where there is limited space in which other types of closures such as hinged doors cannot function. Tambour doors have an articulated construction that permit the door to bend as it moves along a curved path. One example of a tambour door is disclosed in U.S. Pat. No. 6,883,852 to Laskey. Laskey discloses a tambour door made in a multi-shot injection molding process. A relatively rigid substrate is molded in a first mold cavity, and that molding is placed in a second mold cavity for overmolding a softer skin layer over the top of the substrate. The Laskey process thus requires two injection molding steps. In addition, both of the substrate and the skin layer of Laskey have a segmented configuration—that is, the thickness of both of the molded layers is non-uniform in the direction of door movement, making it visibly apparent from its exterior that the door is a tambour door.

SUMMARY

In accordance with various embodiments, a vehicle interior assembly includes a tambour door that is moveable along end guides of the assembly between an open position and a closed position. The tambour door includes a plurality of slats interconnected by a unidirectional cord embedded in a plastic material of each one of the slats.

In various embodiments, the cord is molded-in to each one of the slats.

In various embodiments, the cord includes a yarn including bundled strands.

In various embodiments, the cord includes synthetic fibers.

In various embodiments, the cord includes synthetic fibers that have a glass transition temperature higher than the plastic material.

In various embodiments, the cord includes synthetic fibers including aramid fibers.

In various embodiments, the plastic material completely surrounds the cord.

In various embodiments, each slat includes opposite ends and a central portion extending between the opposite ends. The central portion is made from the same plastic material in which the cord is embedded.

In various embodiments, the slats are spaced apart such that one slat is not connected to an adjacent slat by the plastic material.

In various embodiments, the slats are spaced apart such that one slat is not connected to an adjacent slat by any molded material.

In various embodiments, the tambour door includes a decorative layer coupled with one side of the slats to move together with the slats during movement of the door between the open and closed positions.

In various embodiments, the tambour door includes a decorative layer that is a non-segmented layer.

In various embodiments, the tambour door includes a decorative layer including a natural wood layer.

In various embodiments, a method of making the vehicle interior assembly includes the steps of supporting the unidirectional cord in a cavity of a closed slat molding tool, and filling the cavity with the plastic material to embed the cord in the plastic material to make a substrate of the tambour door. The substrate is subsequently assembled to the end guides to form the vehicle interior assembly.

In various embodiments, at least a portion of a clamp load between first and second portions of the closed molding tool is not applied to the cord during making the vehicle interior assembly.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Figure 1:
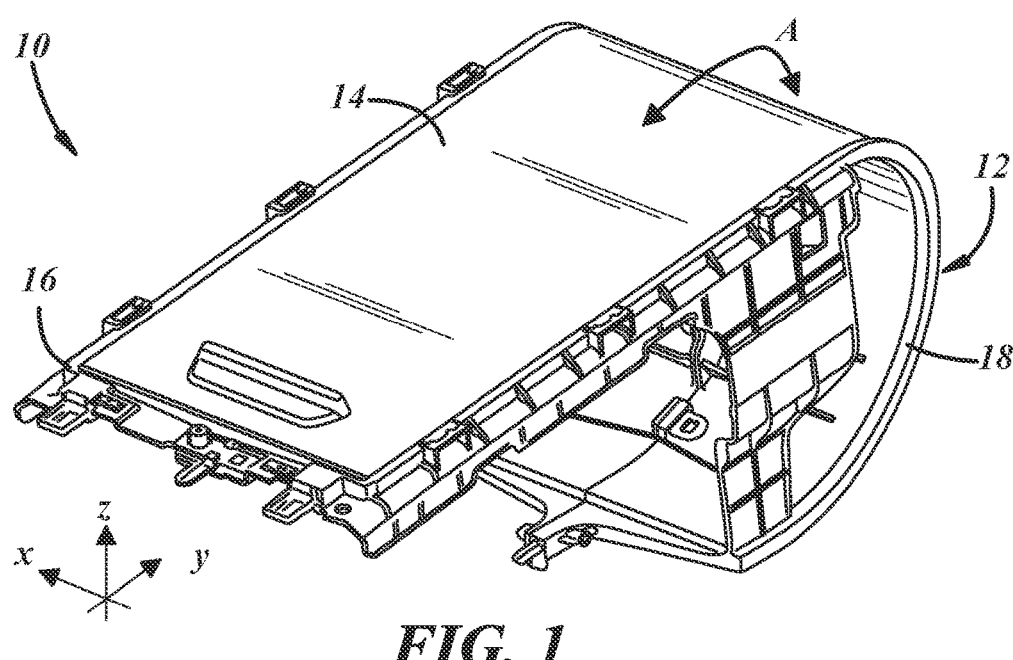
FIG. 1 is an isometric view of a portion of a vehicle interior assembly.
Figure 2:
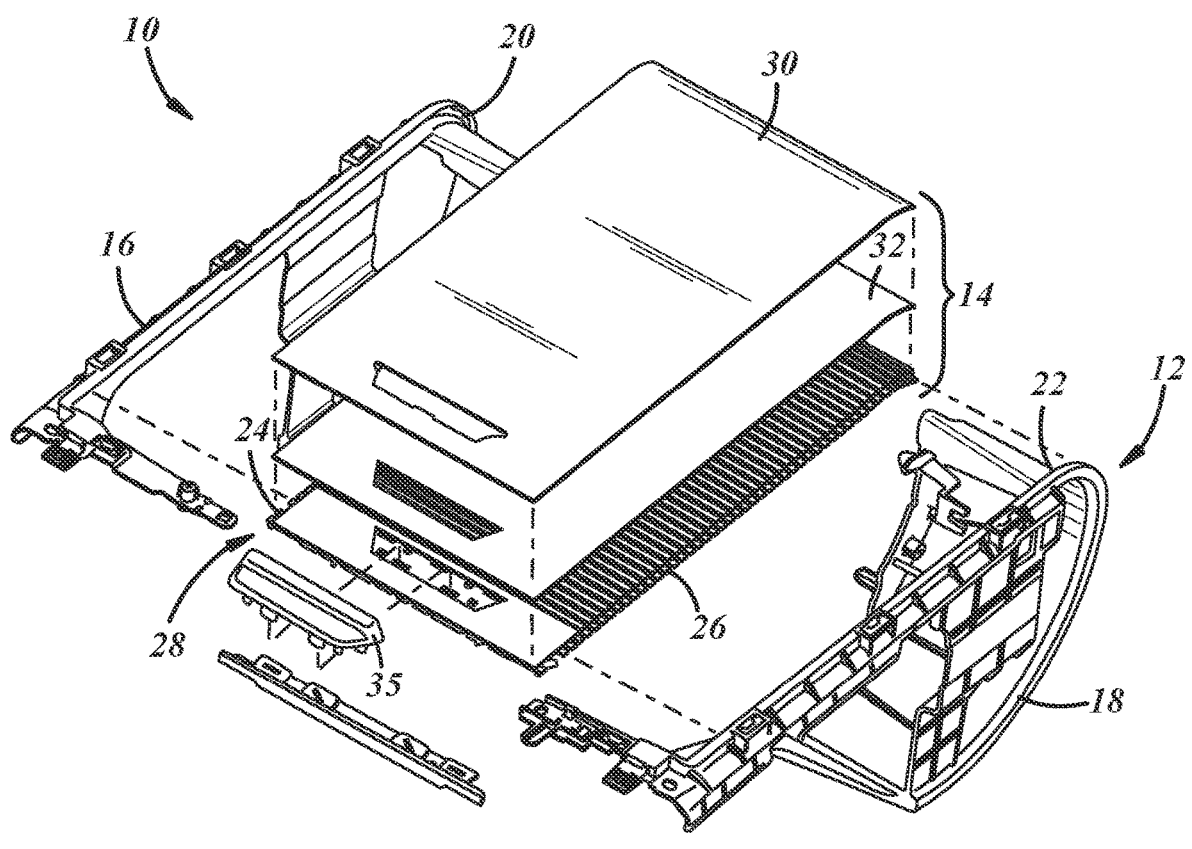
FIG. 2 is an exploded view of the interior assembly of FIG. 1.

Described below is a vehicle interior assembly including a tambour door made in an elegantly simple manner with fewer parts and fewer assembly steps than in the prior art. With reference to FIGS. 1 and 2, a portion of a vehicle interior assembly 10 is illustrated, including a support assembly 12 and a tambour door 14 supported by the support assembly. As illustrated in the exploded view of FIG. 2, the support assembly 12 may include opposite first and second portions 16, 18 that are assembled together with the tambour door 14 therebetween. Each of these portions 16, 18 includes a respective end guide 20, 22 configured to act as guides for tambour door 14 movement between the illustrated closed position and an open position, in which the tambour door is moved in direction A to provide access to an area which is concealed when the door 14 is in the closed position.

The illustrated support assembly 12 and tambour door 14 are part of a vehicle center console as the vehicle interior assembly 10. The end guides 20, 22 of the support assembly 12 in this case include grooves or slots in which respective transverse ends 24, 26 of the tambour door 14 are constrained such that the guides define the instant location and allowable movement of the door. Door movement along the top side of the assembly is in the longitudinal direction (y) of the vehicle. Door movement along a rear side of the assembly is in the longitudinal (y) and vertical (z) directions. The direction A of door movement is a curvilinear direction. As discussed further below, the tambour door 14 has an articulated construction such that it changes between a generally flat or planar configuration when in the closed position and a curved or bent configuration when in the open position. In this example, the opposite ends 24, 26 of the door 14 are essentially posts or protrusions slidingly engaged with the groove-like end guides 20, 22. In other examples, the arrangement is reversed, with the ends 24, 26 of the door 14 including grooves or slots that are guided by rails or other protrusions as the guides 20, 22. The guides 20, 22 and/or the ends 24, 26 may include low-friction surfaces, inserts, or coverings or may include rotational members such as wheels to make movement of the door 14 along the support assembly 12 relatively frictionless.

The support assembly 12 may be mounted along opposing left and right interior walls of a console storage area. In other examples, interior walls of the console may include the end guides 20, 22 as integral features. The vehicles interior assembly 10 may also be something other than a vehicle console. The tambour door 14 may conceal a touch screen of an instrument panel in the closed position, for example, and reveal the touch screen when moved to the open position. In this manner, the tambour door 14 essentially acts as a closure or concealing element that hides things from view when those things are not needed, including functional vehicle elements or access to a storage area. The tambour door 14 could also be used to selectively open or close HVAC intake or discharge ports, or to selectively block sunlight or visibility into or out of the vehicle interior. In any case, the articulated nature of the tambour door 14 facilitates its use in applications where the available space is too limited for a hinged-type closure and permits the door to be completely hidden when in the open position if so desired by vehicle interior designers.

The tambour door 14 includes a substrate 28 and a decorative layer 30 disposed over and coupled with the substrate. In this example, the decorative layer 30 is coupled with the underlying substrate 28 via a bonding layer 32, such as an adhesive layer or a cushioning layer having its opposite sides bonded with the back side of the decorative layer 30 and the outer side of the substrate 28. The substrate 28 has an articulated construction while, in this example, the decorative layer 30 is non-articulated. That is to say that the decorative layer 30 is a solid layer with a uniform thickness relying on its own flexibility for movement with the underlying articulated substrate 28. The decorative layer 30 presents a decorative surface to the vehicle interior and may be made from or include any number of materials, such as leather, a polymeric simulated leather, a simulated wood or metal material, or a natural material.

In one embodiment, the decorative layer 30 includes or is a natural wood layer, such as a wood veneer, made sufficiently thin to be able to flex to follow the profile of the end guides 20, 22 as the door 14 moves between the open and closed positions. The decorative layer 30 may be non-segmented or non-articulated, with a uniform thickness along its entire length and width. In this manner, the tambour door 14 has a non-tambour appearance to an observer and may thus blend in with other adjacent or surrounding decorative materials of the vehicle interior when the door 14 is in the closed position. The illustrated door 14 also includes a handle 35 attached to the substrate 28 and extending through the decorative layer 30 to facilitate manual door movement. Door movement may also be automated via a motor or other actuator.

Figure 3:
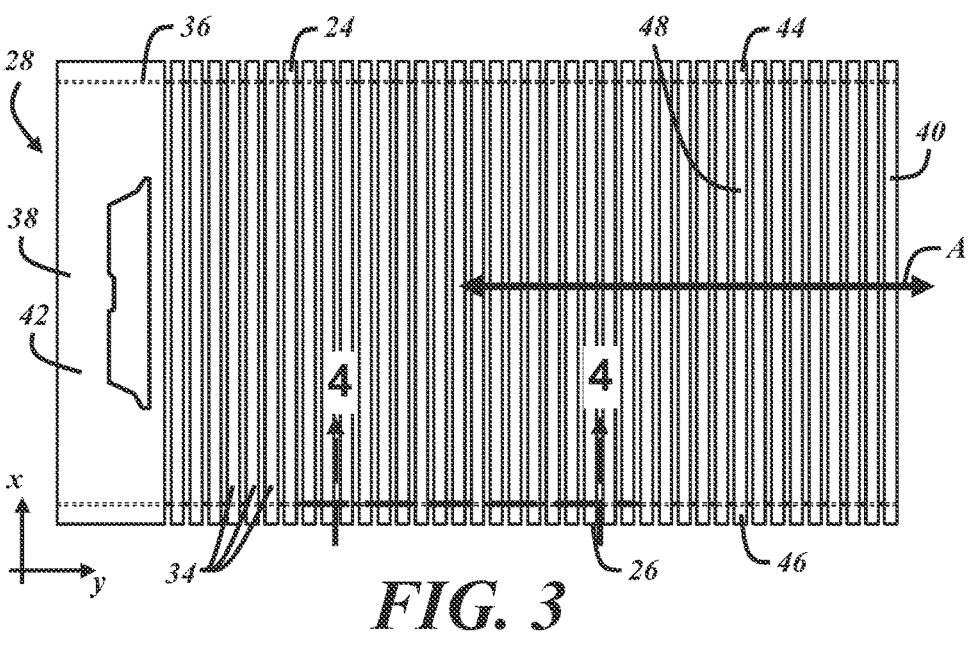
FIG. 3 is a plan view of a tambour door substrate of the interior assembly of FIGS. 1 and 2.

With reference to the plan view of FIG. 3, the substrate 28 of the tambour door 14 is of relatively simple construction, including a plurality of slats 34 and one or more unidirectional cords 36 embedded in a plastic material of each one of the slats. The opposite ends 24, 26 of the door 14 are provided by the substrate 28 and are opposite transverse ends in this example. The door also has opposite longitudinal ends 38, 40 spaced apart along the curvilinear direction of movement (A). In one embodiment, all of the plurality of slats 34 are molded slats (e.g., injection molded) made from a single plastic material in a single molding cycle. A handle portion 42 of the substrate 28 may also be fabricated in the same molding cycle as the slats 34. The unidirectional cords 36 may be embedded in the same plastic material in the same molding cycle as the slats 34. The plastic material may be a rigid or semi-rigid plastic material comprising a thermoplastic material (e.g., ABS, PC/ABS, PP, nylon, polyester, etc.) and may additionally include fillers (e.g., glass fibers, mineral, etc.), impact modifiers, and/or other additives.

Each slat 34 has opposite first and second ends 44, 46 with a central portion 48 extending between its opposite ends. The plastic material in which the cord 36 is embedded may extend continuously from one end 44 to the other end 46 along the entire central portion 48 of each slat. The opposite transverse ends 24, 26 of the door may thus be at least partially defined by the opposite ends 44, 46 of the plurality of slats 34. Other plastic materials are not excluded from use as part of the substrate 28.

The unidirectional cord 36 may extend the full length of the substrate 28 and may be embedded in the plastic material of every one of the plurality of slats 34 as shown. In this example, the cord 36 is embedded in the handle portion 42 of the substrate 28 as well. The cord 36 functions to interconnect all of the slats 34 of the substrate 28 in a mutually parallel arrangement. The slats 34 are spaced apart in the longitudinal direction and along the movement direction A such that, in the absence of the overlying decorative layer 30, the cord or cords 36 are the only element holding the slats 34 together in the desired spatial relationship. As used herein, "unidirectional" means only in the direction of door movement, which is a linear direction that may be rectilinear and/or curvilinear. As noted above, the direction of movement A is defined by the end guides 20, 22 of the support assembly 12. When the substrate 28 is laid flat as in FIG. 3, the cord 36 lies in a horizontal (x-y) plane. Unidirectional also means that the cord is not woven under some slats and under other slats.

The cord 36 can be formed from any material sufficiently strong to hold the slats 34 together in the absence of the decorative layer 30 or other overlying or underlying layers. Where the cord is molded-in to the plastic material of the slats 34, the cord 36 may also be selected to withstand the temperatures and pressures encountered during the molding process. In the illustrated example, the substrate 28 includes two cords 36 running parallel with each other. More or less cords may be used. In one embodiment, each cord 36 is a length of yarn, where a yarn is a bundle of individual strands of material. The strands of the yarn may be woven, braided, twisted, or otherwise bonded with one another, with the cross-sectional size of the yarn being larger than that of a single strand. In other embodiments, each cord 36 is a single strand of material. Yarns may be preferred due to their inherent flexibility, which helps facilitate the cord's function as an articulated joint between slats 34. Yarns may also be preferred when the cord 36 is molded into the slats 34 due to the ability of the interstitial spaces between strands to permit the overmolding material to infuse or at least partially penetrate the yarn for better cord-to-slat bonding. The cord 36 may alternatively have a flat ribbon-like configuration with the opposite flat surfaces of the ribbon facing toward and away from the decorative layer 30 of the finished door 14.

In some embodiments, each cord 36 comprises synthetic fibers or consists essentially of synthetic fibers. Each cord 36 may for example be formed from a nylon, polyester, or UHMWPE thread (e.g., Dyneema® thread). Where the cord 36 is molded-in to the slats 34 in an overmolding process, the cord material may be synthetic and selected to have a higher melting point ($T_m$) and/or glass transition temperature ($T_g$) than the overmolded plastic material. In one particular example, each cord comprises or consists essentially of aramid fibers (e.g., Kevlar®). Aramid fibers have been found to suitably withstand the temperatures involved in plastic molding processes (i.e., the fibers do not melt) while also withstanding the pressures involved in injection molding processes. For instance, aramid fibers may maintain their initial position during the molding process due to their strength and due to their high temperature strength-i.e., the molten plastic overmolding material does not substantially soften the aramid fibers during a molding process such that an aramid yarn can be placed in a mold cavity under tension and kept relatively stationary within the cavity even when surrounded by molten molding material and when oriented across a flow direction of the molten molding material.

Other types of materials, fibers, strands, and yarns may also be suitable, depending somewhat on the type of over-molding material being used. Each cord 36 may be formed from a multi-strand continuous fiber material, where the fibers include aramid fibers, glass fibers, carbon fibers, metal (e.g., stainless or coated steel) fibers, nylon fibers, and/or other suitable fibers. Another consideration is the coefficient of linear thermal expansion of the cord material, where a lower CLTE is generally better. In various embodiments, the cord 36 comprises fibers having a CLTE of $\pm 4 \times 10^{-6}$ per ° F. or less, and preferably less than $\pm 3 \times 10^{-6}$ per ° F. A lower CLTE helps with dimensional stability of the cord 36 during the rapid heating and subsequent cooling involved in an overmolding process. Where the cord 36 is a yarn, it may be a 3000-denier yarn, a 6000-denier yarn, a 9000-denier yarn, or another suitable yarn fineness. The cord 36 may further include an anti-static lubricant along its circumference or along the individual strands of a yarn.

Figure 4:
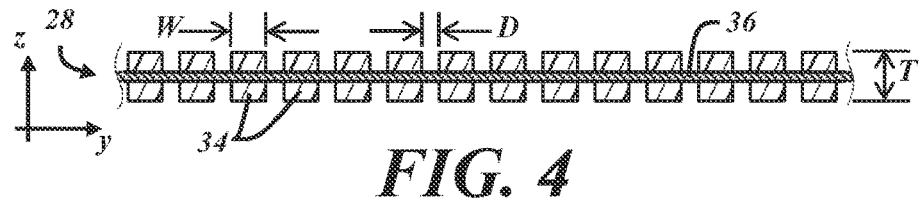
FIG. 4 is an enlarged cross-sectional view of a portion of the substrate of FIG. 3.

FIG. 4 is a cross-sectional view of a portion of the tambour door substrate 28 of FIG. 3, taken along one of the unidirectional cords 36. As illustrated, the plastic material of each slat 34 may entirely surround the cord. Stated differently, wherever the cord 36 is embedded in the plastic material of a slat 34, that plastic material is present around the entire perimeter or cross-sectional circumference of the cord. In the illustrated example, the cord 36 is located within the thickness T of each slat 34 about midway between the opposite top and bottom sides of the slats. In other embodiments, the cord 36 may be offset toward the bottom sides of the slats 34. The thickness T of each slat 34 may be in a non-limiting range from 3 millimeters to 15 millimeters, more preferably from 5 millimeters to 12 millimeters. In a specific embodiment, the thickness T of each slat 34 is in a range from 7 millimeters to 11 millimeters, or from 8 millimeters to 10 millimeters. The cord 36 may have a diameter or average cross-sectional dimension in a range from 0.5 millimeters to 2.5 millimeters, or 0.5 millimeters to 1.5 millimeters. Smaller is generally better from a cord material cost perspective and for flexibility in the articulated joints of the substrate 28. However, a larger cord diameter may be necessary for prevention of movement of the cord 36 during overmolding.

The slats 34 are spaced apart in the direction of movement A of the door 14, and the spacing D between adjacent slats 34 may be in a range from 1 millimeter to 10 millimeters, or from 1 millimeter to 7 millimeters. In a specific embodiment, the spacing D between adjacent slats 34 is in a range from 2 millimeters to 4 millimeters, or about 3 millimeters. A width W of each slat 34 may be less than or equal to the thickness T of each slat. Each slat 34 may have the same length L, thickness T, width W, and distance D between itself and an adjacent slat. The slats 34 may be spaced apart, as shown, such that one slat is not connected to an adjacent slat by the same plastic material in which the cord 36 is embedded and/or such that none of the slats are connected to adjacent slats by the same plastic material in which the cord is embedded. The plastic material of the slats 34 may be the only plastic material of the substrate 28 (excluding polymeric cord materials) such that one slat is not connected to an adjacent slat by the any molded material and/or such that none of the slats are connected to adjacent slats by any molded material.

Figure 5:
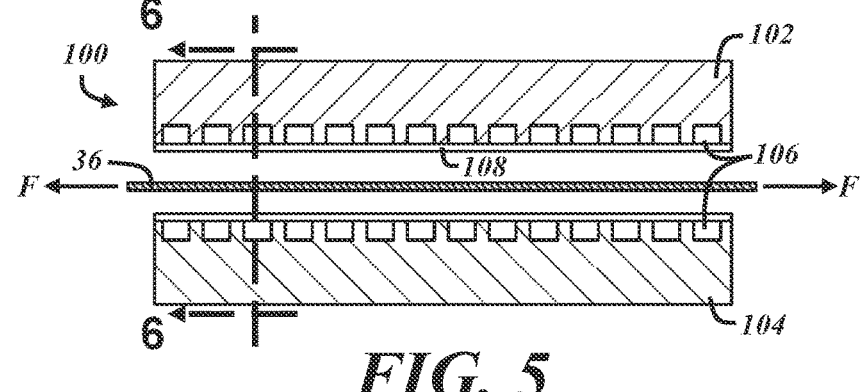
FIG. 5 is a cross-sectional view of a portion of a slat molding tool in an open condition with a cord supported between first and second portions of the tool.

FIGS. 5-9 schematically illustrate at least a portion of a method of making the above-described tambour door 14. These figures show formation of a version of the tambour door substrate 28 with a smaller number of slats 34 than in FIGS. 1-3. FIGS. 5-9 illustrate portions of a slat molding tool 100, which is simplified here for illustrative purposes. Skilled artisans will recognize that the molding tool 100 may include several non-illustrated features, such as ejector pins, cooling lines, a hot runner system, injection ports, etc. The method may include first supporting the unidirectional cord 36 between opposing first and second portions 102, 104 of the slat molding tool 100 while the molding tool is in an open condition, as shown in FIG. 5, which is a cross-sectional view taken along a plane passing through the length of the cord 36 similar to that of FIG. 4. Each portion 102, 104 of the tool 100 includes recesses 106 corresponding in location with the slats 34 of the finished substrate 28.

Figure 6:
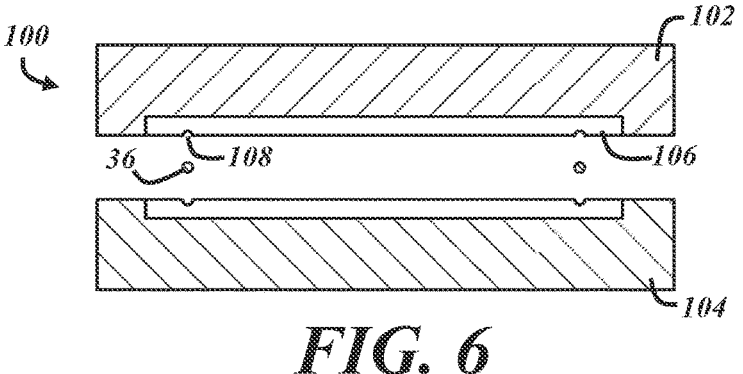
FIG. 6 is a cross-sectional view of the molding tool of FIG. 5.

FIG. 6 is a cross-sectional view of the same molding tool 100 taken through recesses 106 of the molding tool. As shown here, one or both portions 102, 104 of the tool 100 may include recesses or clearance features 108 to accommodate the cord(s) 36 so that, when the opposite portions 102, 104 of the tool are moved toward each other to place the tool in a closed condition, as in corresponding FIGS. 7 and 8, the cord 36 is not subjected to the full clamp load C of the molding press in which the molding tool 100 is mounted. Preferably, the recesses 108 are sized such that the cord 36 is subjected to little or none of the clamp load C, for example less than 1%, less than 0.1%, less than 0.01%, or substantially none of the clamp load C. In this manner, the cord 36 is not cut into pieces by the closing molding tool so that it can maintain its position during material injection.

As shown in FIG. 5, the cord 36 may be placed in tension under a tensile load (F) before the tool 100 is changed to the closed condition. This tension can help stabilize the position of the cord in the tool 100 during molding.

Figure 7:
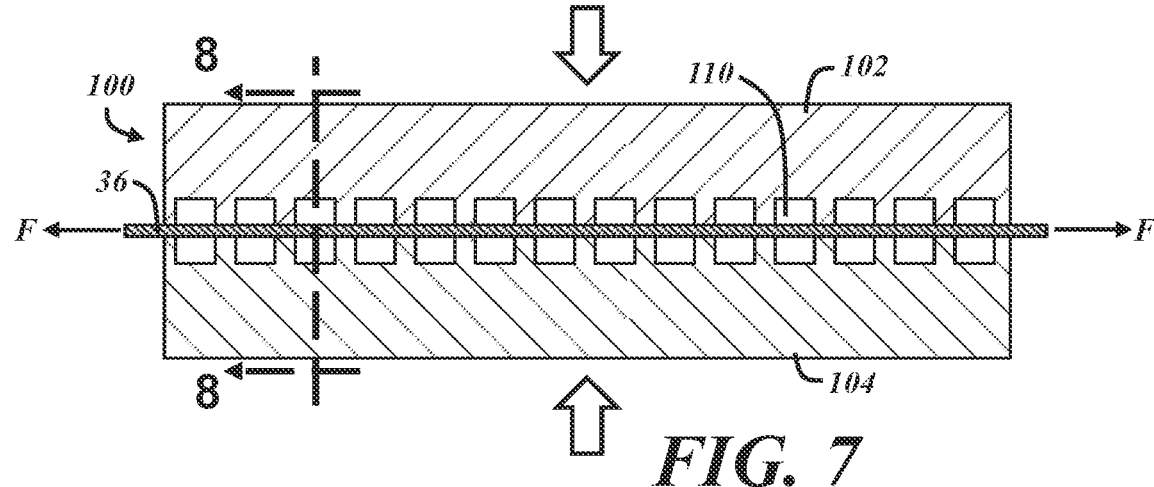
FIG. 7 is the cross-sectional view of FIG. 5 with the molding tool in a closed condition.
Figure 8:
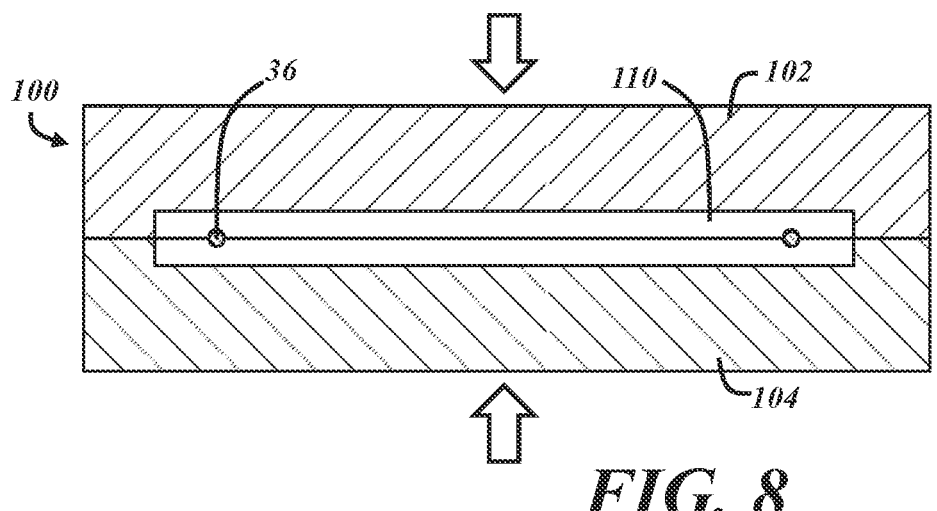
FIG. 8 is a cross-sectional view of the molding tool of FIG. 7.

FIGS. 7 and 8 are respectively the same cross-sectional views of FIGS. 5 and 6 after the tool 100 has been changed from the open condition to the closed condition. The recesses 106 of the first and second portions 102, 104 of the tool combine to form a mold cavity 110 when the tool is in the closed condition. While not shown here, the cavity may include a runner system with branches connecting one or more injection ports of the molding tool 100 to the portions of the cavity 110 that form the slats 34 of the substrate 28. The runner system may be located at ends of the cavity 110 corresponding to ends 44, 46 of the slats 34, for example.

Figure 9:
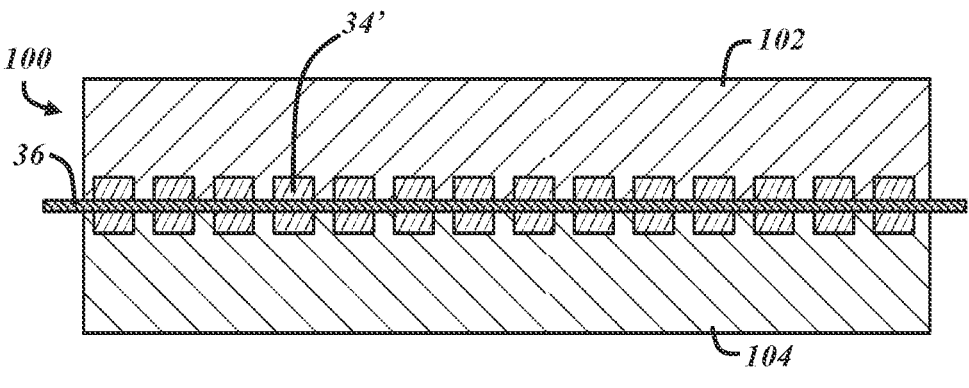
FIG. 9 is the cross-sectional view of FIG. 7 with a mold cavity of the molding tool filled with a plastic material.

Molten plastic material 34' is then introduced into the cavity 110, by injection, for example, as shown in FIG. 9. The plastic material is then allowed to cool and solidify into the slats 34 of the substrate 28 as in FIGS. 3 and 4, after which the tool 100 is returned to the open condition of FIGS. 5 and 6 for removal of the molded tambour door substrate. Solidified plastic material from any runner system may be removed at this time, and excess cord extending beyond the full length of the substrate 28 may also be trimmed away.

Processes other than thermoplastic injection molding may be suitable to embed the cord 36 in the plastic material, such as reaction injection molding, transfer molding, compression molding, or thermoforming, which may also be considered a molding process.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior assembly comprising a tambour door that is moveable along end guides of the assembly between an open position and a closed position, the tambour door comprising a plurality of discrete slats interconnected by a unidirectional cord embedded in a plastic material of each one of the slats, wherein the cord is molded-in to each one of the slats, wherein the cord comprises synthetic fibers, and wherein the synthetic fibers have a glass transition temperature higher than said plastic material.

2. The vehicle interior assembly of claim 1, wherein the cord comprises a yarn comprising bundled strands.

3. The vehicle interior assembly of claim 1, wherein the synthetic fibers have a higher melting point than said plastic material.

4. The vehicle interior assembly of claim 1, wherein the synthetic fibers comprise aramid fibers.

5. The vehicle interior assembly of claim 1, wherein the plastic material completely surrounds the cord.

6. The vehicle interior assembly of claim 1, wherein each slat comprises opposite ends and a central portion extending between the opposite ends, the central portion being made from the same plastic material in which the cord is embedded.

7. The vehicle interior assembly of claim 1, wherein adjacent slats of the plurality of discrete slats are not connected by the plastic material.

8. The vehicle interior assembly of claim 1, wherein adjacent slats of the plurality of discrete slats are not connected by any molded material.

9. The vehicle interior assembly of claim 1, wherein the tambour door further comprises a decorative layer coupled with one side of the slats to move together with the slats during movement of the door between the open and closed positions.

10. The vehicle interior assembly of claim 9, wherein the decorative layer is a non-segmented layer.

11. The vehicle interior assembly of claim 9, wherein the decorative layer comprises a natural wood layer.

12. A vehicle interior assembly comprising a tambour door that is moveable along end guides of the assembly between an open position and a closed position, the tambour door comprising a plurality of discrete slats interconnected by a unidirectional cord embedded in a plastic material of each one of the slats, wherein the cord is molded-in to each one of the slats, wherein the cord comprises synthetic fibers, and wherein the synthetic fibers have a higher melting point than said plastic material.

13. The vehicle interior assembly of claim 12, wherein the tambour door further comprises a non-segmented decorative layer coupled with the slats to move together with the slats during movement of the door between the open and closed positions.

14. The vehicle interior assembly of claim 13, wherein the decorative layer is a non- segmented layer.

15. The vehicle interior assembly of claim 13, wherein the decorative layer comprises a natural wood layer.

16. The vehicle interior assembly of claim 12, wherein the cord comprises a yarn comprising bundled strands.

17. The vehicle interior assembly of claim 12, wherein the synthetic fibers comprise aramid fibers.

18. The vehicle interior assembly of claim 12, wherein the plastic material completely surrounds the cord.

19. The vehicle interior assembly of claim 12, wherein each slat comprises opposite ends and a central portion extending between the opposite ends, the central portion being made from the same plastic material in which the cord is embedded.

20. The vehicle interior assembly of claim 12, wherein adjacent slats of the plurality of discrete slats are not connected by any molded material.

* * * * *